(12) United States Patent
Agiwal et al.

(10) Patent No.: US 11,528,743 B2
(45) Date of Patent: Dec. 13, 2022

(54) METHOD AND APPARATUS FOR INTERRUPTION HANDLING FOR VEHICLE TO EVERYTHING COMMUNICATION

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/235,098

(22) Filed: Apr. 20, 2021

(65) Prior Publication Data

US 2021/0329689 A1  Oct. 21, 2021

Related U.S. Application Data

(60) Provisional application No. 63/012,401, filed on Apr. 20, 2020.

(51) Int. Cl.
*H04W 72/14* (2009.01)
*H04W 72/12* (2009.01)
*H04W 72/02* (2009.01)

(52) U.S. Cl.
CPC ............ *H04W 72/14* (2013.01); *H04W 72/02* (2013.01); *H04W 72/1242* (2013.01); *H04W 72/1257* (2013.01)

(58) Field of Classification Search
CPC . H04W 36/03; H04W 72/02; H04W 72/1242; H04W 72/1257; H04W 72/14; H04W 76/14; H04W 76/19; H04W 92/18
See application file for complete search history.

(56) References Cited

U.S. PATENT DOCUMENTS

| | | | |
|---|---|---|---|
| 2017/0366920 A1 | 12/2017 | Agiwal | |
| 2021/0022035 A1* | 1/2021 | Lee | H04W 74/002 |
| 2021/0105787 A1* | 4/2021 | Park | H04W 72/085 |
| 2022/0201716 A1* | 6/2022 | Yi | H04W 72/1289 |
| 2022/0217743 A1* | 7/2022 | Zhou | H04W 72/1284 |

FOREIGN PATENT DOCUMENTS

CN  110536445 A  12/2019

OTHER PUBLICATIONS

Samsung, "Remaining Issues: Sidelink CSI Reporting, Interruption handling", R2-2002558, 3GPP TSG-RAN2 Meeting #109bis Electronic, Apr. 20-24, 2020.

(Continued)

*Primary Examiner* — Kashif Siddiqui
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and apparatus for interruption handling for V2X communication are provided.

20 Claims, 9 Drawing Sheets

(56) References Cited

OTHER PUBLICATIONS

Samsung, "DAPS HO and NR Sidelink Communication", R2-200910, 3GPP TSG-RAN2 Meeting #112 Electronic, Nov. 2-13, 2020.
Samsung, "DAPS HO and NR Sidelink Communication", R2-2100149, 3GPP TSG-RAN2 Meeting #113 Electronic, Jan. 25, 2021-Feb. 5, 2021.
Nokia et al., 'On NR V2X sidelink transmissions during handover or Uu PHY layer problems', R2-1915193, 3GPP TSG RAN WG2 Meeting #108, Reno, USA, sections 2-3, Nov. 7, 2019.
Ericsson, 'LCP restriction enhancement based on PHY priority indication', R2-2000788, 3GPP TSG RAN WG2 Meeting #109-e, sections 2-3, Feb. 13, 2020.
Oppo, 'Left issue on LCP for NR V2X', R2-1915825, 3GPP TSG RAN WG2 Meeting #108, Reno, USA sections 2-3, Nov. 8, 2019.
LG Electronics Inc., 'Remaining exceptional pool aspects', R2-2001000, 3GPP TSG RAN WG2 Meeting #109-e sections 2-3, Feb. 13, 2020.
International Search Report dated Jul. 19, 2021, issued in International Patent Application No. PCT/KR2021/004957.

\* cited by examiner

METHOD AND APPARATUS FOR INTERRUPTION HANDLING FOR VEHICLE TO EVERYTHING COMMUNICATION

CROSS-REFERENCE TO RELATED APPLICATION(S)

This application is based on and claims priority under 35 U.S.C. § 119(e) of a U.S. Provisional application Ser. No. 63/012,401, filed on Apr. 20, 2020, in the U.S. Patent and Trademark Office, the disclosure of which is incorporated by reference herein in its entirety.

BACKGROUND

1. Field

The disclosure relates to a wireless communication system. More particularly, the disclosure relates to an apparatus, a method and a system for interruption handling for vehicle to everything (V2X) communication in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including a smart home, a smart building, a smart city, a smart car or connected cars, a smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there are needs to enhance V2X communication recently for wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a first terminal is provided. The method includes receiving, from a base station, a control message including a configuration for a configured sidelink grant, transmitting, to a second terminal, a sidelink signal based on the configured sidelink grant for a first sidelink logical channel which is allowed to use the configured sidelink grant, starting a timer associated with a radio link failure, in case that a consecutive out of synchronization indications for a cell are received from a lower layer, identifying whether there is a second sidelink logical channel which is not available for the configured sidelink grant, transmitting, to the second terminal while the timer is running, the sidelink signal based on the configured sidelink grant, in case that there is no sidelink logical channel not available for the configured sidelink grant, and transmitting, to the second terminal while the timer is running, the sidelink signal based on a resource from an exceptional transmission pool, in case that there is the second sidelink logical channel not available for the configured sidelink grant.

In accordance with another aspect of the disclosure, a method performed by a second terminal is provided. The method includes receiving, from a base station, a control message including a configuration for a configured sidelink grant, and receiving, from a first terminal, a sidelink signal based on the configured sidelink grant for a first sidelink logical channel which is allowed to use the configured sidelink grant, wherein, while a timer associated with a radio link failure is running, the sidelink signal is received from the first terminal based on the configured grant, in case that there is no sidelink logical channel not available for the configured sidelink grant, and wherein, while the timer is running, the sidelink signal is received from the first terminal based on a resource from an exceptional transmission pool, in case that there is second logical channel not available for the configured sidelink grant.

In accordance with another aspect of the disclosure, a first terminal is provided. The first terminal includes a transceiver configured to transmit and receive a signal, and a controller configured to receive, from a base station, a control message including a configuration for a configured sidelink grant, transmit, to a second terminal, a sidelink signal based on the configured sidelink grant for a first sidelink logical channel which is allowed to use the configured sidelink grant, start a timer associated with a radio link failure, in case that a consecutive out of synchronization indications for a cell are received from a lower layer, identify whether there is a second sidelink logical channel which is not available for the configured sidelink grant, transmit, to the second terminal while the timer is running, the sidelink signal based on the configured sidelink grant, in case that there is no sidelink logical channel not available for the configured sidelink grant, and transmit, to the second terminal while the timer is running, the sidelink signal based on a resource from an exceptional transmission pool, in case that there is the second sidelink logical channel not available for the configured sidelink grant.

In accordance with another aspect of the disclosure, a second terminal is provided. The second terminal includes a transceiver configured to transmit and receive a signal, and a controller configured to receive, from a base station, a control message including a configuration for a configured sidelink grant, and receive, from a first terminal, a sidelink signal based on the configured sidelink grant for a first sidelink logical channel which is allowed to use the configured sidelink grant, wherein, while a timer associated with a radio link failure is running, the sidelink signal is received from the first terminal based on the configured grant, in case that there is no sidelink logical channel not available for the configured sidelink grant, and wherein, while the timer is running, the sidelink signal is received from the first terminal based on a resource from an exceptional transmission pool, in case that there is second logical channel not available for the configured sidelink grant.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
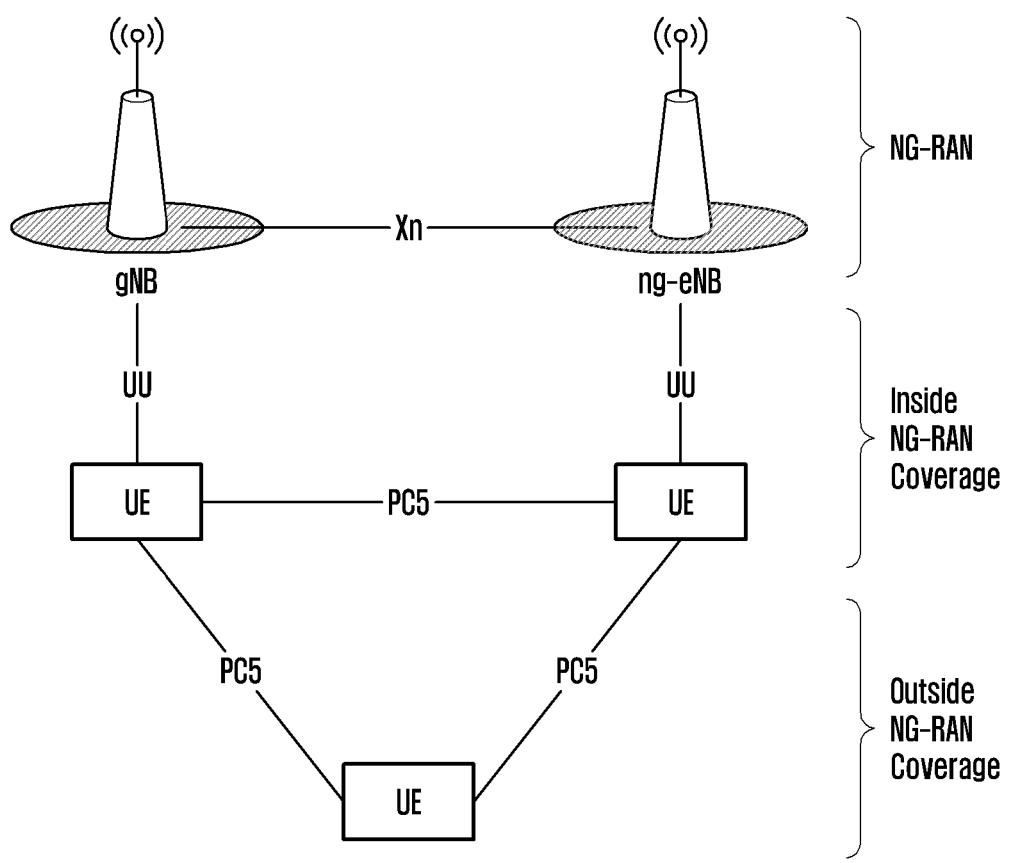
FIG. 1 is an architecture supporting PC5 interface according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as a BS, a base transceiver station (BTS), a node B (NB), an evolved NB (eNB), an access point (AP), a 5G NB (5GNB), or a gNB.

The "UE" is an entity communicating with a BS and may be referred to as a UE, a device, a mobile station (MS), a mobile equipment (ME), or a terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, a fifth generation wireless communication system (also referred as next generation radio or NR) is being developed to meet the growing demand for high speed data services, support ultra-reliability and low latency applications.

In the fifth generation wireless communication system operating in higher frequency (mmWave) bands, the UE and the gNB communicate with each other using Beamforming Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either Evolved Universal Mobile Telecommunications System (UMTS) Terrestrial Radio Access (E-UTRA) (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (SCells). In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. Primary SCG Cell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, Physical Downlink Control Channel (PDCCH) is used to schedule DL transmissions on Physical Downlink Shared Channel (PDSCH) and UL transmissions on Physical Uplink Shared Channel (PUSCH), where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying the one or more UEs of the physical resource block (s) (PRB(s)) and orthogonal frequency division multiplexing (OFDM) symbol(s) where the UE may assume no transmission is intended for the UE; Transmission of transmission power command (TPC) commands for Physical Uplink Control Channel (PUCCH) and PUSCH; Transmission of one or more TPC commands for sounding reference signal (SRS) transmissions by the one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured BWP wherein each search configuration is uniquely identified by an identifier. Identifier of search space configuration to be used for specific purpose such as paging reception, SI reception, random access response reception is explicitly signaled by the gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot}) \bmod (\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by the gNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each coreset configuration is associated with a list of Transmission configuration indicator (TCI) states. One downlink (DL) reference signal (RS) identity (ID) (synchronization signal block (SSB) or channel state information reference signal (CSI-RS)) is configured per TCI state. The list of TCI states corresponding to a coreset configuration is signaled by the gNB via radio resource control (RRC) signaling. One of the TCI state in TCI state list is activated and indicated to the UE by the gNB. TCI state indicates the DL TX beam (DL TX beam is quasi-collocated (QCLed) with SSB/CSI-RS of TCI state) used by the gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring the RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In an RRC connected state, the UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, node B (gNB) or base station in cell broadcast Synchronization Signal and physical broadcast channel (PBCH) block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in the SIB 1 includes mapping between the SIBs and the SI messages, periodicity of each SI message and SI window length. The scheduling information in the SIB 1 includes an indicator for each SI message, which indicates whether the concerned SI message is being broadcasted or not. If at least one SI message is not being broadcasted, SIB1 may include random access resources (physical random access channel (PRACH) preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in the SIB1. The cell specific SIB is applicable only within a cell that provides the SIB while the area specific SIB is applicable within an area referred to as SI area, which consists of one or several cells and is identified by systemInformationAreaID.

FIG. 1 is an architecture supporting PC5 interface according to an embodiment of the disclosure.

Referring to FIG. 1, 4G and 5G wireless communication system supports vehicular communication services. Vehicular communication services, represented by V2X services, can consist of the following four different types: vehicle to vehicle (V2V), vehicle to infrastructure (V2I), vehicle to network (V2N) and vehicle to pedestrian (V2P). In fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. The information allows the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

V2X services can be provided by a PC5 interface and/or a Uu interface. Support of V2X services via PC5 interface is provided by NR sidelink communication or V2X sidelink communication, which is a mode of communication, whereby the UEs can communicate with each other directly over the PC5 interface using NR technology or E-UTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIG. 1. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. Unicast transmission, characterized by support of at least one PC5-RRC connection between peer UEs; Transmission and reception of control information and user traffic between peer UEs in sidelink; Support of sidelink hybrid automatic repeat request (HARQ) feedback; Support of radio link control (RLC) acknowledged mode (AM); and Support of sidelink radio link monitoring (RLM) for both peer UEs to detect radio link failure (RLF). Groupcast transmission, characterized by: Transmission and reception of user traffic among UEs belonging to a group in sidelink; Support of sidelink HARQ feedback. Broadcast transmission, characterized by: Transmission and reception of user traffic among UEs in sidelink.

The AS protocol stack for the control plane in the PC5 interface consists of RRC, packet data convergence protocol (PDCP), RLC and medium access control (MAC) sublayer, and the physical layer. The AS protocol stack for user plane in the PC5 interface consists of service data adaptation protocol (SDAP), PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different sidelink control channels (SCCHs) are configured for PC5-RRC and PC5-S signaling respectively.

The MAC sublayer provides the following services and functions over the PC5 interface: Radio resource selection; Packet filtering; Priority handling between uplink and sidelink transmissions for a given UE; Sidelink CSI reporting. With logical channel prioritization (LCP) restrictions in MAC, only sidelink logical channels belonging to the same destination can be multiplexed into a MAC protocol data unit (PDU) for every unicast, groupcast and broadcast transmission which is associated to the destination. NG-RAN can also control whether a sidelink logical channel can utilize the resources allocated to a configured sidelink grant Type 1. For packet filtering, a sidelink shared channel (SL-SCH) MAC header including portions of both Source Layer-2 ID and a Destination Layer-2 ID is added to each MAC PDU. Logical Channel ID (LCID) included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s); and Sidelink Broadcast Control Channel (SBCCH): a sidelink channel for broadcasting sidelink system information from one UE to other UE(s).

The following connections between logical channels and transport channels exist:

SCCH can be mapped to SL-SCH;
STCH can be mapped to SL-SCH; and
SBCCH can be mapped to sidelink broadcast channel (SL-BCH).

The RRC sublayer provides the following services and functions over the PC5 interface:

Transfer of a PC5-RRC message between peer UEs;
Maintenance and release of a PC5-RRC connection between two UEs; and
Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

The UE can operate in two modes for resource allocation in sidelink:

Scheduled resource allocation, characterized by:
The UE needs to be RRC_CONNECTED in order to transmit data;
NG-RAN schedules transmission resources.
UE autonomous resource selection, characterized by:
The UE can transmit data when inside NG-RAN coverage, irrespective of which RRC state the UE is in, and when outside NG-RAN coverage;
The UE autonomously selects transmission resources from a pool of resources.
For NR sidelink communication, the UE performs sidelink transmissions only on a single carrier.

Scheduled Resource Allocation: NG-RAN can dynamically allocate resources to the UE via the sidelink radio network temporary identifier (SL-RNTI) on PDCCH(s) for NR sidelink Communication. In addition, NG-RAN can allocate sidelink resources to UE with two types of configured sidelink grants:

With type 1, RRC directly provides the configured sidelink grant for NR sidelink communication
With type 2, RRC provides the periodicity of the configured sidelink grant while PDCCH can either signal and activate the configured sidelink grant, or deactivate it. The PDCCH provides the actual grant (i.e. resources) to be used. The PDCCH is addressed to SL-CS-RNTI for NR sidelink communication and SL Semi-Persistent Scheduling V-RNTI for V2X sidelink communication.

For the UE performing NR sidelink communication, there can be more than one configured sidelink grant activated at a time on the carrier configured for sidelink transmission. When beam failure or physical layer problem occurs on NR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

UE Autonomous Resource Allocation: The UE autonomously selects sidelink grant from a pool of resources provided by broadcast system information or dedicated signaling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by SIB (e.g. reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for a target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with global network satellite system (GNSS) in case GNSS is configured as synchronization source. If the exceptional transmission resource pool is included in the handover command, the UE uses randomly selected resources from the exceptional transmission resource pool, starting from the reception of handover command. If the UE is configured with the scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB2I or in dedicated signaling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

Meanwhile, if the UE is configured with the scheduled resource allocation for V2X communication, one or more configured grant (CG) Type 1 and/or CG type 2 SL grant configurations is signaled by the gNB. The Dynamic SL grants and CG Type 1 and/or CG Type 2 SL grants are used for V2X communication transmission. The UE is also configured with RLM-RS resources (s). On each RLM-RS resource, the UE estimates the downlink radio link quality and compares it to the thresholds $Q_{out}$ and $Q_{in}$. $Q_{out}$ is the level at which the downlink radio link cannot be reliably received and corresponds to the out-of-sync block error rate ($BLER_{out}$). $Q_{in}$ is the level at which the downlink radio link quality can be received with higher reliability and corresponds to the in-sync block error rate ($BLER_{in}$). $BLER_{out}$ and $BLER_{in}$ are signalled to the UE by the gNB. Out of sync indication is generated when downlink radio link quality on all the configured RLM-RS resources is worse than $Q_{out}$. In sync indication is generated when downlink radio link quality on at least one of the configured RLM-RS resources is better than $Q_{in}$. Upon detecting physical layer problem for the SpCell i.e. upon receiving N310 consecutive out-of-sync indications from lower layers, timer T310 is started. The values of N310 and T310 are signaled to the UE by the gNB. While the timer T310 is running, the UE continues to use Configured SL grants. Upon expiry of timer T310, the UE uses the resources from exceptional TX resource pool. The issue is that the Configured SL Grants usage is limited to some SL LCHs and hence V2X transmission will be interrupted for one or more SL LCHs which are not allowed to use the configured SL grants.

Embodiment 1-1

Figure 2:
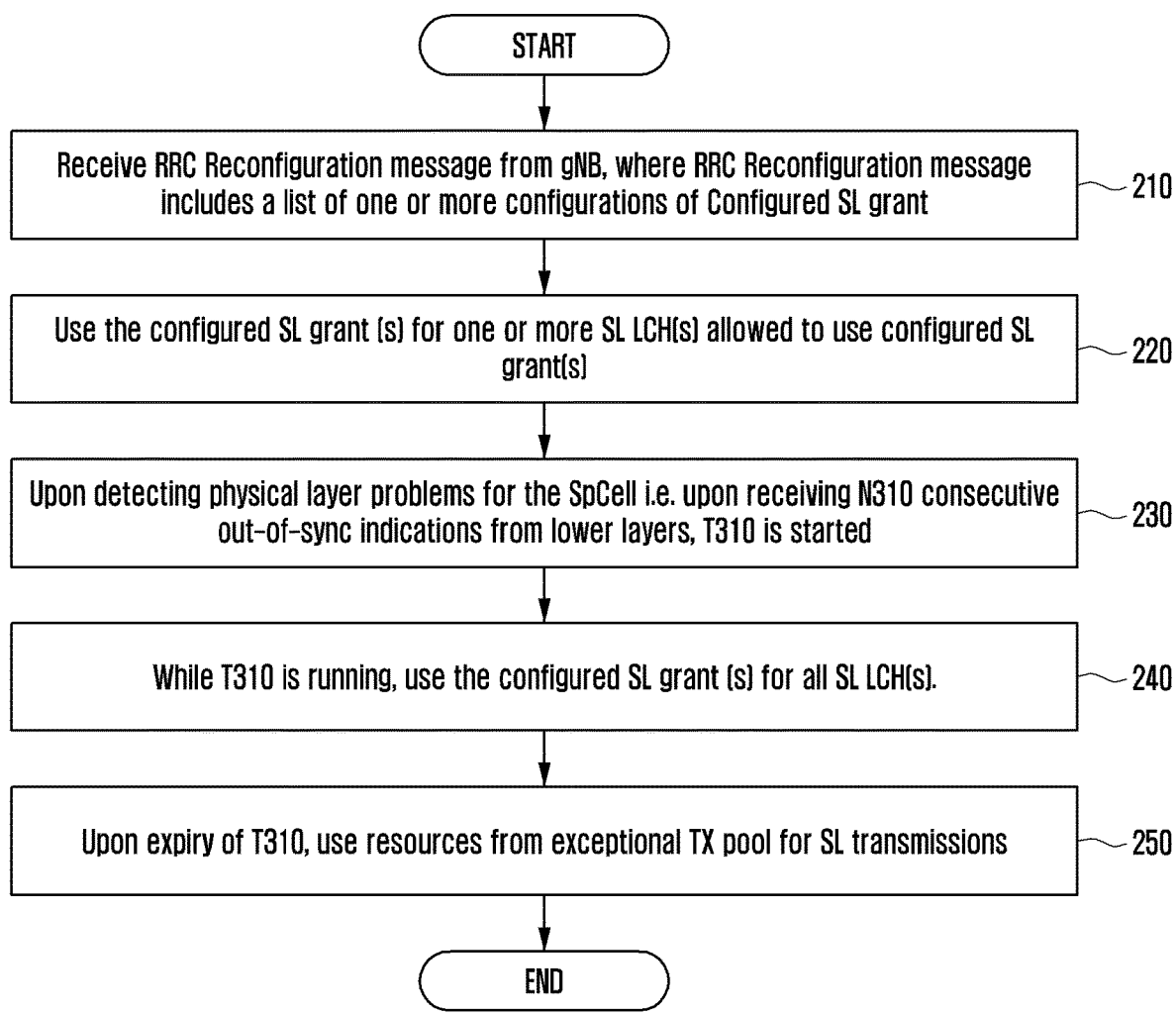
FIG. 2 illustrates a flowchart according to an embodiment of the disclosure.

FIG. 2 illustrates a flowchart according to an embodiment of the disclosure.

In one method of this disclosure, the UE operation for SL communication transmission is as shown in FIG. 2.

Referring to FIG. 2, the UE is in a RRC Connected state and is performing NR sidelink communication using scheduled resource configuration provided by the serving cell (the serving cell can be PCell in an embodiment, the serving cell can be SpCell in another embodiment). The resource configuration for the scheduled resource allocation is received from the gNB in the RRC reconfiguration message (210). The RRC reconfiguration message includes a list of one or more configured SL grant configurations. A configured SL grant configuration can be one of CG type 1 or CG type 2.

Each configured SL grant configuration includes a list of SL LCH priorities for which the configured SL grants based on that configuration is applicable. Each SL LCH is associated with a SL LCH priority. If the SL LCH priority of the SL LCH is included in the list of the SL LCH priorities in the configured SL grant configuration, the configured SL grants based on that configuration can be used for SL transmissions from that SL LCH. In each configured SL grant, the UE schedules data from one or more SL LCH(s) which are allowed to use that configured SL grant (220).

In the RRC Connected state, the UE performs radio link monitoring. The downlink radio link quality of the primary cell is monitored by the physical layer in the UE for the purpose of indicating out-of-sync/in-sync status to higher layers. The physical layer in the UE indicates, in the frames where the radio link quality is assessed, out-of-sync to higher layers when the radio link quality is worse than the threshold Q_out for all resources in the set of resources for radio link monitoring. When the radio link quality is better than the threshold Q_in for any resource in the set of resources for radio link monitoring, the physical layer in the UE indicates, in frames where the radio link quality is assessed, in-sync to higher layers (i.e. RRC).

Upon receiving N310 consecutive out-of-sync indications from lower layers (i.e. physical layer), higher layer (i.e. RRC) starts a timer T310 at operation 230. The value of N310 and T310 is configured by network using RRC signaling. While T310 is running, the UE uses the configured SL grant (s) for all SL LCH(s) at operation 240 irrespective of whether a SL LCH is allowed to use that configured SL grant or not as per configuration received from the gNB. Upon expiry of timer T310, configured SL grant configurations received from the gNB is released. Upon expiry of timer T310, the UE uses the resources from exceptional TX resource pool received from the gNB in the SI or the dedicated RRC signaling for SL transmissions at operation 250. The UE can continue to use the dynamic SL grant received from the gNB while T310 is running and the UE stops monitoring for a dynamic SL grant upon expiry of T310. Alternately, the UE stops monitoring for the dynamic SL grant upon start of T310. If T310 is stopped due to in sync indications, in each configured SL grant, the UE schedules data from one or more SL LCH(s) which are allowed to use that configured SL grant.

In an embodiment while T310 is running, amongst the list of configured SL grant configurations, the SL grants of a specified configuration is used for all SL LCHs irrespective of whether a SL LCH is allowed to use that configured SL grant or not as per configuration received from the gNB. The index of specified configuration can be pre-defined (e.g. the 1st or the last in the list) or it can be signaled. For the SL grants of all other SL grant configurations, the UE schedules data from one or more SL LCH(s) which are allowed to use that configured SL grant. Before the start of T310 (or when T310 is stopped), in the SL grants for this specified configuration, the UE schedules data from one or more SL LCH(s) which are allowed to use that configured SL grant.

In another embodiment, when the UE is configured with the scheduled resource allocation and the configured SL grants are not configured:

Option 1: the UE can continue to use the dynamic SL grant received from the gNB while T310 is running and the UE stops monitoring for the dynamic SL grant upon expiry of T310. Upon expiry of timer T310, the UE uses the resources from exceptional TX resource pool received from the gNB in the SI or the dedicated RRC signaling for SL transmissions.

Option 2: the UE stops monitoring for the dynamic SL grant upon start of timer T310. Dynamic SL grant is not used for SL transmissions upon start of timer T310. Upon start of timer T310, the UE uses the resources from exceptional TX resource pool received from the gNB in the SI or the dedicated RRC signaling for SL transmissions. If T310 is stopped due to in sync indications, the UE starts monitoring for the dynamic SL grant and starts using the dynamic SL grant for the SL transmissions.

For example, let's say the UE has four SL LCHs (say LCH 1, LCH 2, LCH 3 and LCH 4) established for NR sidelink communication. The network configures CG Type 1 SL grant in a reconfiguration message. The CG Type 1 SL grant is allowed to be used for LCH 1 and LCH 2 as per configuration received from the network. Until the time T310 is started, the UE uses the CG type 1 SL grant for LCH 1 and LCH 2. While T310 is running the UE uses the CG Type 1 for LCH 1 to LCH 4. Upon expiry of T310, the UE stops using the CG type 1 SL grant.

In one embodiment of the above operation the configured SL grant is of CG Type 1. In another embodiment of the above operation the configured SL grant is of CG Type 2. In another embodiment of the above operation the configured SL grant can be any of CG type 1 or CG type 2.

Figure 3:
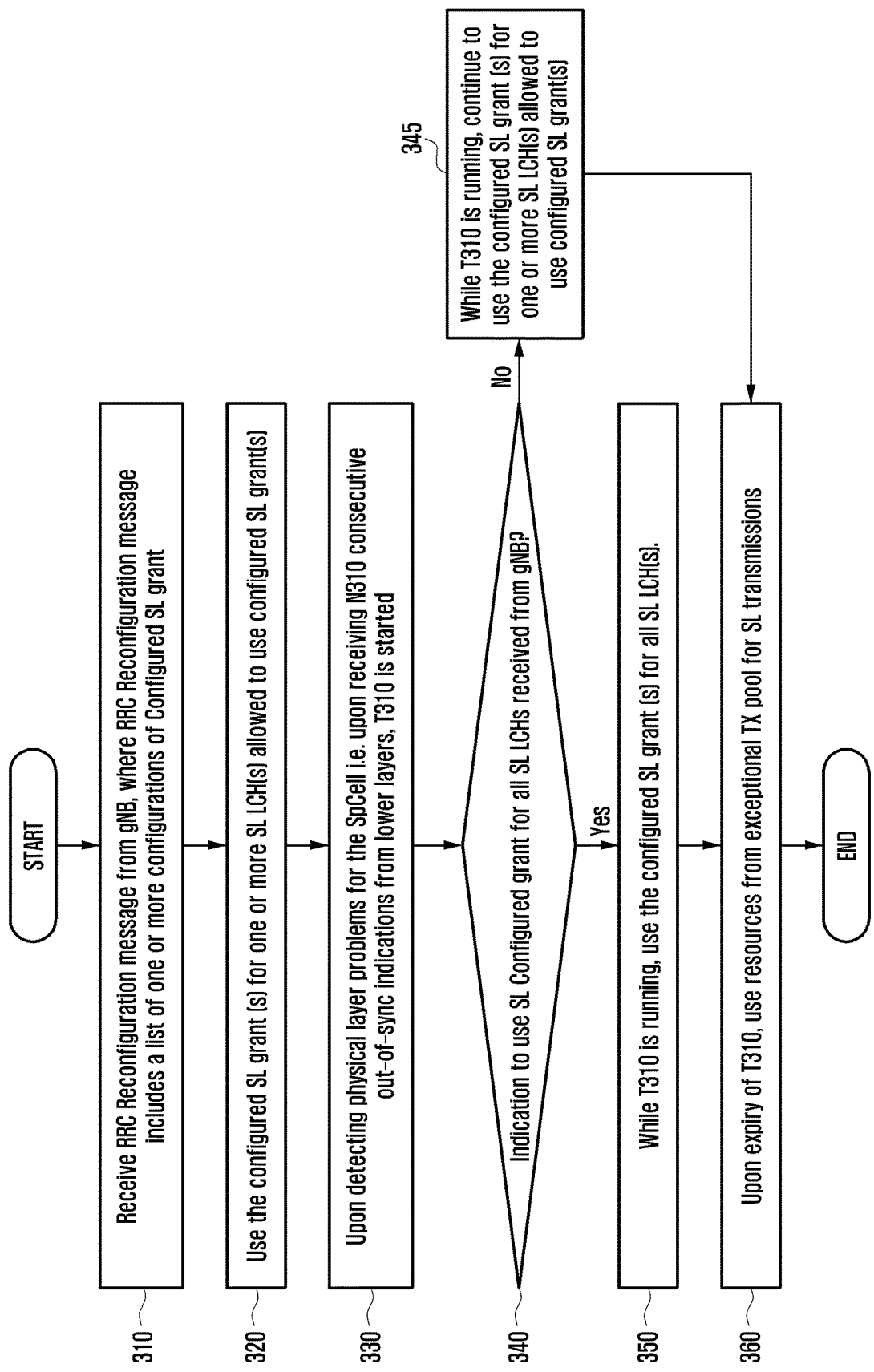
FIG. 3 illustrates a flowchart according to an embodiment of the disclosure.

FIG. 3 illustrates a flowchart according to an embodiment of the disclosure.

Referring to FIG. 3, in an alternate embodiment of this method of disclosure, network may indicate whether the UE is allowed to use the configured SL grants for all SL LCHs or only the indicated SL LCHs while T310 is running at operations 340 and 350. A presence of a new parameter (UseCGforAllSLLCHs) in an RRC reconfiguration message can indicate that the UE can use CG for all SL LCHs while T310 is running. The new parameter (UseCGforAllSLLCHs) in the RRC reconfiguration message may be set to TRUE to indicate that the UE can use CG for all SL LCHs while T310 is running. If the new parameter (UseCGforAllSLLCCHs) is not present or is set to FALSE, the CG can be used for one or more SL LCH(s) which are allowed (or indicated) to use the configured SL grants at operation 345. For either cases, upon expiry of T310 timer, the UE can use resources from exceptional TX pool for SL transmissions in operation 360. The operations described above in FIG. 2 may be similarly applied to steps not specified in FIG. 3.

Embodiment 1-2

Figure 4:
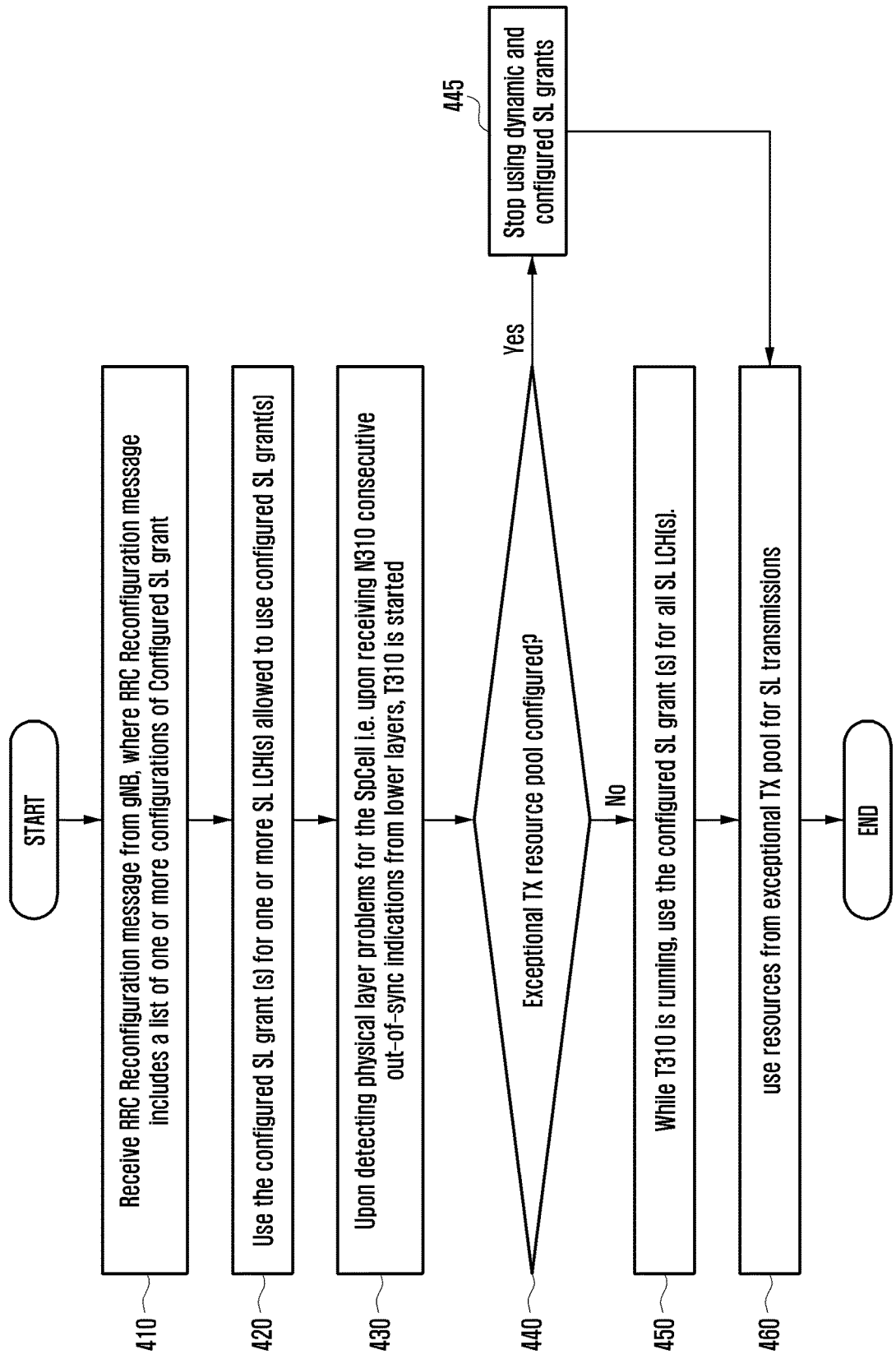
FIG. 4 illustrates a flowchart according to an embodiment of the disclosure.

FIG. 4 illustrates a flowchart according to an embodiment of the disclosure.

In one method of this disclosure, the UE operation for SL communication transmission is as shown in FIG. 4.

Referring to FIG. 4, the UE is in the RRC Connected state and is performing NR sidelink communication using scheduled resource configuration provided by the serving cell (the serving cell can be PCell in an embodiment, the serving cell can be SpCell in another embodiment). The resource configuration for the scheduled resource allocation is received from the gNB in the RRC reconfiguration message. The RRC reconfiguration message includes a list of one or more configured SL grant configurations at operation 410. Each configured SL grant configuration can be one of CG type 1 or CG type 2.

Each configured SL grant configuration includes a list of SL LCH priorities for which the configured SL grants based on that configuration is applicable. Each SL LCH is associated with a SL LCH priority. If the SL LCH priority of SL LCH is included in a list of SL LCH priorities in the configured SL grant configuration, configured SL grants based on that configuration can be used for SL transmissions from that SL LCH. In each configured SL grant, the UE schedules data from one or more SL LCH(s) which are allowed to use that configured SL grant at operation 420 according to logical channel prioritization (LCP) procedure.

In the RRC Connected state, the UE performs radio link monitoring. The downlink radio link quality of the primary cell is monitored by physical layer in the UE for the purpose of indicating out-of-sync/in-sync status to higher layers. The physical layer in the UE indicates, in frames where the radio link quality is assessed, out-of-sync to higher layers when the radio link quality is worse than the threshold Q_out for all resources in the set of resources for radio link monitoring. When the radio link quality is better than the threshold Q_in for any resource in the set of resources for radio link monitoring, the physical layer in the UE indicates, in frames where the radio link quality is assessed, in-sync to higher layers (i.e. RRC).

Upon receiving N310 consecutive out-of-sync indications from lower layers (i.e. physical layer), higher layer (i.e. RRC) starts a timer T310 at operation 430. The value of N310 and T310 is configured by network using RRC signaling. While T310 is running, if the exceptional TX resource pool is not configured at operation 440, the UE uses the configured SL grant (s) for all SL LCH(s) irrespective of whether a SL LCH is allowed to use that configured SL grant or not as per configuration received from the gNB at operation 450. Upon expiry of timer T310, configured SL grant configurations received from the gNB is released.

Upon start of T310, if the exceptional TX resource pool is available at operation 440, the UE uses the resources from the exceptional TX resource pool received from the gNB in the SI or the dedicated RRC signaling for SL transmissions at operation 460. The UE stops using the dynamic SL grant and the configured SL grant upon start of T310 at operation 445. If T310 is stopped due to in sync indications, the UE will stop using exceptional TX resource pool for SL transmissions and starts using dynamic SL grant and configured SL grant in the same manner as before the start of T310.

In one embodiment of the above operation the configured SL grant is of CG Type 1. In another embodiment of the above operation the configured SL grant is of CG Type 2. In another embodiment of the above operation the configured SL grant can be any of CG type 1 or CG type 2.

Embodiment 1-3

Figure 5:
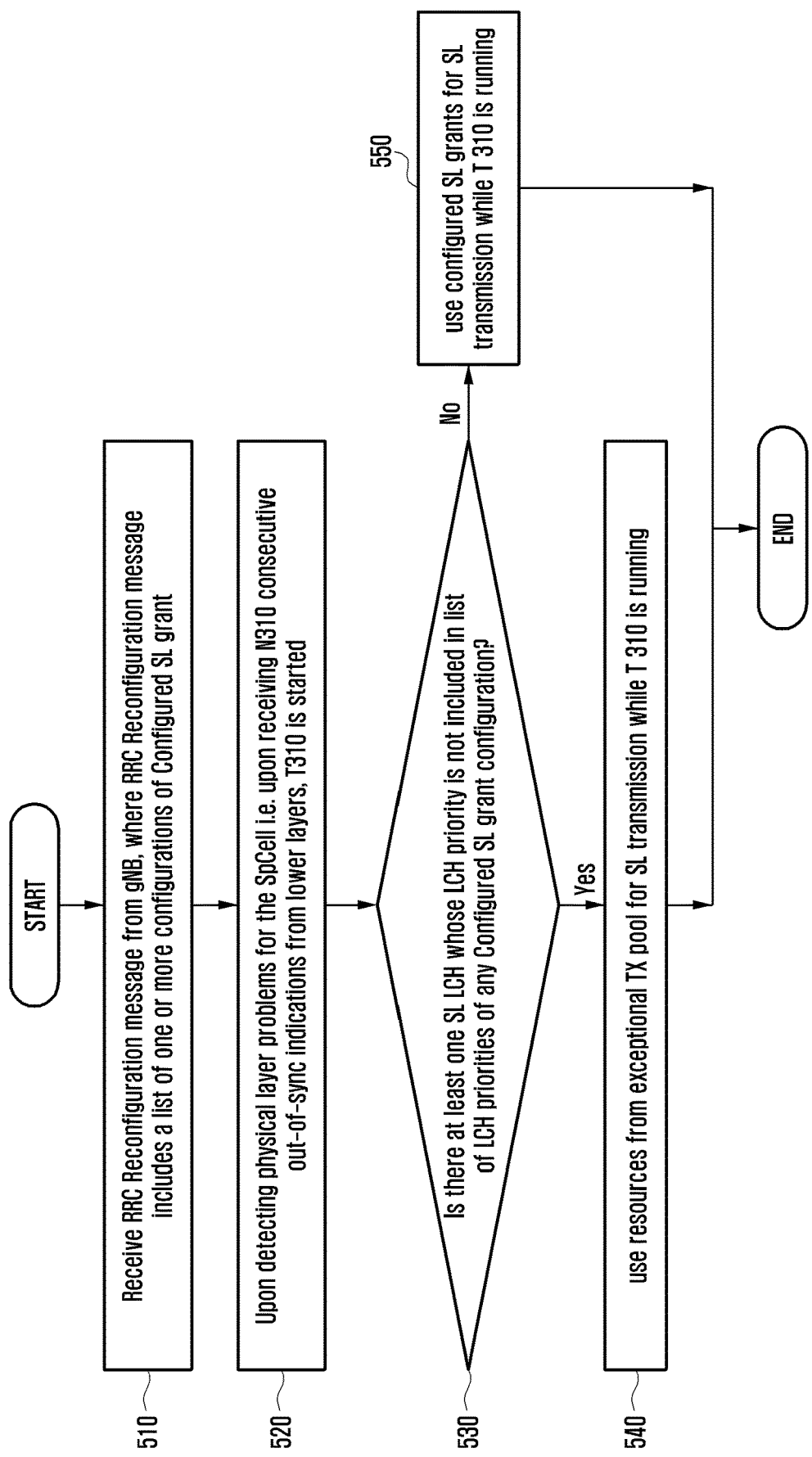
FIG. 5 illustrates a flowchart according to an embodiment of the disclosure.
Figure 6:
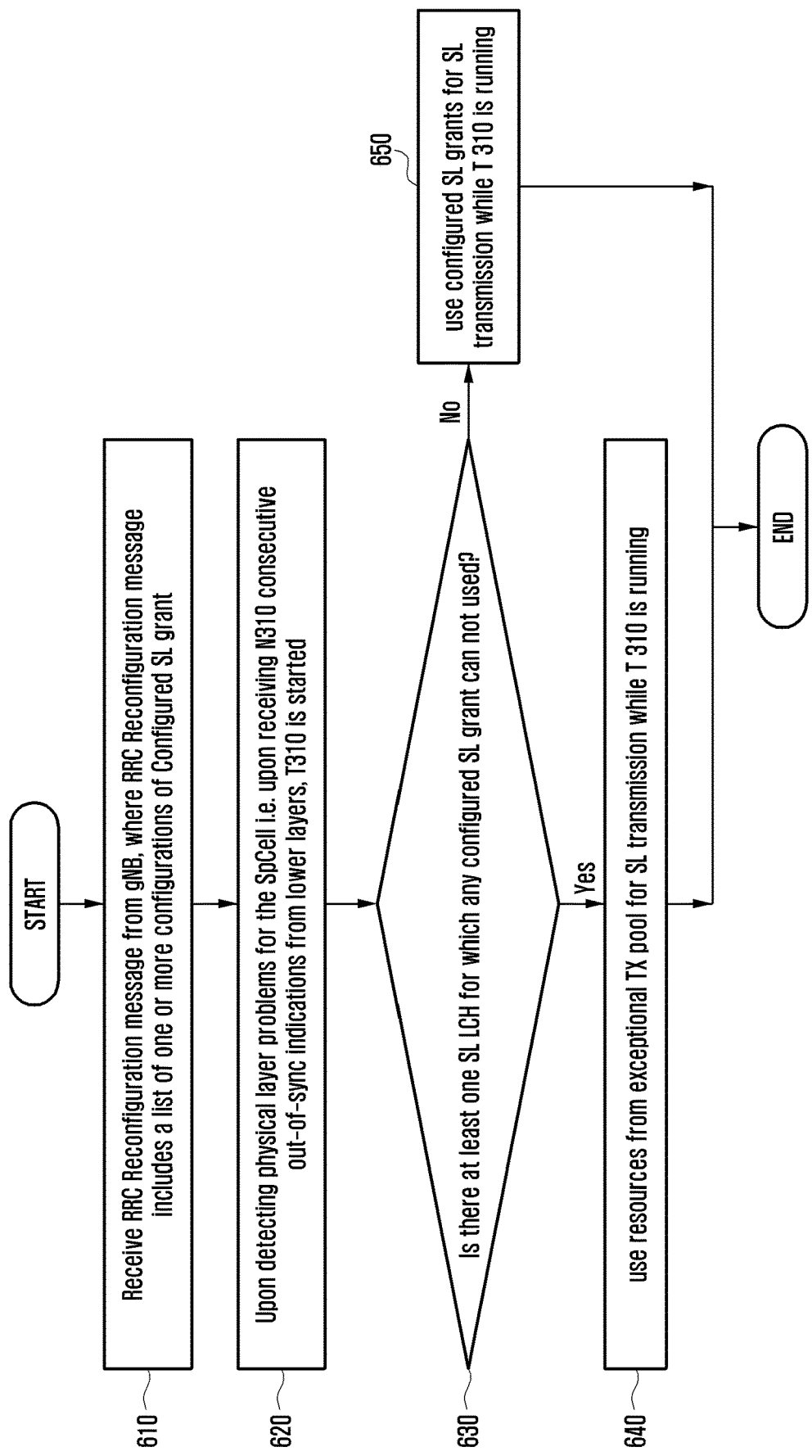
FIG. 6 illustrates a flowchart according to an embodiment of the disclosure.

FIGS. 5 and 6 illustrate flowcharts according to various embodiments of the disclosure.

In one method of this disclosure, the UE operation for SL communication transmission is as shown in FIG. 5 and FIG. 6.

Referring to FIGS. 5 and 6, the UE is in the RRC Connected state and is performing NR sidelink communication using scheduled resource configuration provided by the serving cell (the serving cell can be PCell in an embodiment, the serving cell can be SpCell in another embodiment). The resource configuration for the scheduled resource allocation is received from the gNB in the RRC reconfiguration message. The RRC reconfiguration message includes a list of one or more configured SL grant configurations (510, 610). Each configured SL grant configuration can be one of CG type 1 or CG type 2.

Each configured SL grant configuration includes a list of SL LCH priorities for which the configured SL grants based on that configuration is applicable. Each SL LCH is associated with a SL LCH priority. If the SL LCH priority of SL LCH is included in the list of SL LCH priorities in the configured SL grant configuration, the configured SL grants based on that configuration can be used for SL transmissions from that SL LCH. In each configured SL grant, the UE schedules data from one or more SL LCH(s) which are allowed to use that configured SL grant according to logical channel prioritization.

In the RRC Connected state, the UE performs radio link monitoring. The downlink radio link quality of the primary cell is monitored by physical layer in the UE for the purpose of indicating out-of-sync/in-sync status to higher layers. The physical layer in the UE indicates, in frames where the radio link quality is assessed, out-of-sync to higher layers when the radio link quality is worse than the threshold Q_out for all resources in the set of resources for radio link monitoring. When the radio link quality is better than the threshold Q_in for any resource in the set of resources for radio link monitoring, the physical layer in the UE indicates, in frames where the radio link quality is assessed, in-sync to higher layers (i.e. RRC).

Upon receiving N310 consecutive out-of-sync indications from lower layers (i.e. physical layer), higher layer (i.e. RRC) starts a timer T310. The value of N310 and T310 is configured by network using RRC signaling (520, 620).

Upon start of T310, if the UE is configured with SL configured grant, the UE determines whether there is at least one SL LCH for which SL configured grant cannot be used (530, 630). The determination is done based on association between SL LCH priorities and SL configured grants which is signaled by the gNB.

If there is at least one SL LCH for which SL configured grant cannot be used (530, 630):
  The UE uses the resources from exceptional TX resource pool received from the gNB in the SI or the dedicated RRC signaling for SL transmissions (540, 640).
  The UE stops using dynamic SL grant and configured SL grant for SL transmissions.
Else (530, 630)
  The UE use the configured SL grants while T310 is running (550, 650). The UE can continue to use the dynamic SL grant received from the gNB while T310 is running and the UE stops monitoring for the dynamic SL grant upon expiry of T310. Alternately, the UE stops monitoring for the dynamic SL grant upon start of T310.

Upon expiry of timer T310, the configured SL grant configurations received from the gNB is released. Upon expiry of timer T310, the UE uses the resources from exceptional TX resource pool received from the gNB in the SI or the dedicated RRC signaling for SL transmissions.

In another embodiment, when the UE is configured with the scheduled resource allocation and the configured SL grants are not configured:
  Option 1: the UE can continue to use the dynamic SL grant received from the gNB while T310 is running and the UE stops monitoring for the dynamic SL grant upon expiry of T310. Upon expiry of timer T310, the UE uses the resources from exceptional TX resource pool received from the gNB in the SI or the dedicated RRC signaling for SL transmissions.
  Option 2: the UE stops monitoring for the dynamic SL grant upon start of timer T310. Upon start of timer T10, the UE uses the resources from exceptional TX resource pool received from the gNB in the SI or the dedicated RRC signaling for SL transmissions. If T310 is stopped due to in sync indications, the UE starts monitoring for dynamic SL grant.

In one embodiment of the above operation the configured SL grant is of CG Type 1. In another embodiment of the above operation the configured SL grant is of CG Type 2. In another embodiment of the above operation the configured SL grant can be any of CG type 1 or CG type 2.

Embodiment 1-4

Figure 7:
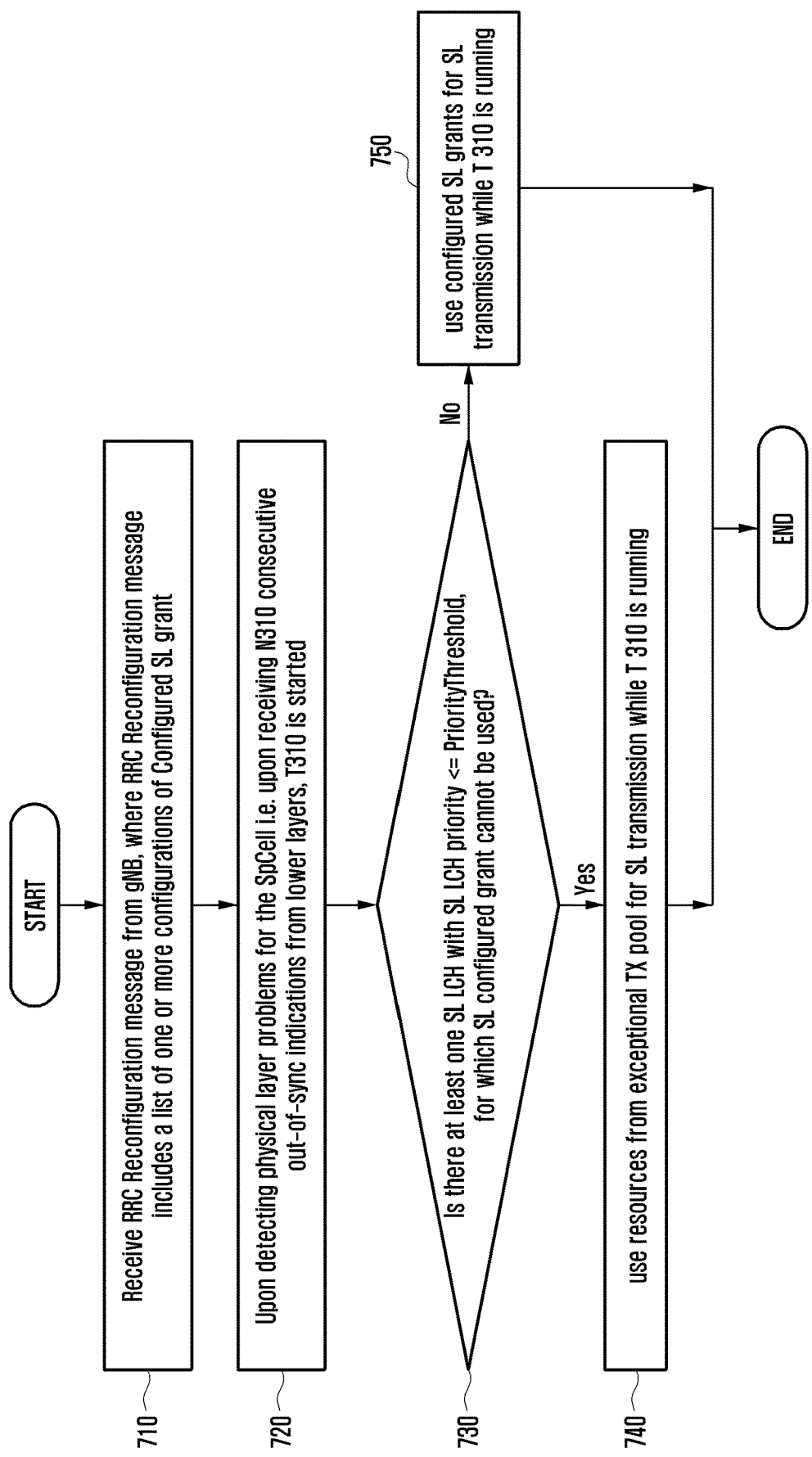
FIG. 7 illustrates a flowchart according to an embodiment of the disclosure.

FIG. 7 illustrates a flowchart according to an embodiment of the disclosure.

In one method of this disclosure, the UE operation for SL communication transmission is as shown in FIG. 7.

Referring to FIG. 7, the UE is in the RRC Connected state and is performing NR sidelink communication using scheduled resource configuration provided by the serving cell (the serving cell can be a PCell in an embodiment, the serving cell can be a SpCell in another embodiment). The resource configuration for the scheduled resource allocation is received from the gNB in the RRC reconfiguration message. The RRC reconfiguration message includes a list of one or more configured SL grant configurations at operation 710. Each configured SL grant configuration can be one of CG type 1 or CG type 2.

Each configured SL grant configuration includes a list of SL LCH priorities for which the configured SL grants based on that configuration is applicable. Each SL LCH is associated with a SL LCH priority. If the SL LCH priority of SL LCH is included in list of SL LCH priorities in the configured SL grant configuration, the configured SL grants based on that configuration can be used for SL transmissions from that SL LCH. In each configured SL grant, the UE schedules data from one or more SL LCH(s) which are allowed to use that configured SL grant according to logical channel prioritization.

In the RRC Connected state, the UE performs radio link monitoring. The downlink radio link quality of the primary cell is monitored by physical layer in the UE for the purpose of indicating out-of-sync/in-sync status to higher layers. The physical layer in the UE indicates, in frames where the radio link quality is assessed, out-of-sync to higher layers when the radio link quality is worse than the threshold Q_out for all resources in the set of resources for radio link monitoring. When the radio link quality is better than the threshold Q_in for any resource in the set of resources for radio link monitoring, the physical layer in the UE indicates, in frames where the radio link quality is assessed, in-sync to higher layers (i.e. RRC).

Upon receiving N310 consecutive out-of-sync indications from lower layers (i.e. physical layer), higher layer (i.e. RRC) starts a timer T310 at operation 720. The value of N310 and T310 is configured by network using RRC signaling.

Upon start of T310, if the UE is configured with SL configured grant, the UE determines whether there is at least one SL LCH with the SL LCH priority<=PriorityThreshold for which the configured SL grant cannot be used at operation 730. The determination is done based on association between the SL LCH priorities and the SL configured grants and PriorityThreshold which is signaled by the gNB.

If there is at least one SL LCH with the SL LCH priority <=PriorityThreshold for which the configured SL grant cannot be used at operation 730:
  The UE uses the resources from exceptional TX resource pool received from the gNB in the SI or the dedicated RRC signaling for SL transmissions at operation 740.
  The UE stops using dynamic SL grant and configured SL grant for SL transmissions.

Else at operation 730

The UE use the configured SL grants while T310 is running at operation 750. The UE can continue to use the dynamic SL grant received from the gNB while T310 is running and the UE stops monitoring for the dynamic SL grant upon expiry of T310. Alternately, the UE stops monitoring for the dynamic SL grant upon start of T310.

Upon expiry of timer T310, configured SL grant configurations received from the gNB is released. Upon expiry of timer T310, the UE uses the resources from exceptional TX resource pool received from the gNB in the SI or the dedicated RRC signaling for SL transmissions.

In another embodiment, when the UE is configured with the scheduled resource allocation and the configured SL grants are not configured:

Option 1: the UE can continue to use the dynamic SL grant received from the gNB while T310 is running and the UE stops monitoring for the dynamic SL grant upon expiry of T310. Upon expiry of timer T310, the UE uses the resources from exceptional TX resource pool received from the gNB in the SI or the dedicated RRC signaling for SL transmissions.

Option 2: the UE stops monitoring for the dynamic SL grant upon start of timer T310. Upon start of timer T310, the UE uses the resources from exceptional TX resource pool received from the gNB in the SI or the dedicated RRC signaling for SL transmissions. If T310 is stopped due to in sync indications, the UE starts monitoring for dynamic SL grant.

In one embodiment of the above operation the configured SL grant is of CG Type 1. In another embodiment of the above operation the configured SL grant is of CG Type 2. In another embodiment of the above operation the configured SL grant can be any of CG type 1 or CG type 2.

Embodiment 1-5

The UE is in the RRC Connected state and is performing NR sidelink communication using scheduled resource configuration provided by the serving cell (the serving cell can be PCell in an embodiment, the serving cell can be SpCell in another embodiment). The resource configuration for the scheduled resource allocation is received from the gNB in the RRC reconfiguration message. The RRC reconfiguration message includes a list of one or more configured SL grant configurations. Each configured SL grant configuration can be one of CG type 1 or CG type 2.

Each configured SL grant configuration includes a list of SL LCH priorities for which the configured SL grants based on that configuration is applicable. Each SL LCH is associated with a SL LCH priority. If the SL LCH priority of the SL LCH is included in list of SL LCH priorities in the configured SL grant configuration, the configured SL grants based on that configuration can be used for SL transmissions from that SL LCH. In each configured SL grant, the UE schedules data from one or more SL LCH(s) which are allowed to use that configured SL grant according to logical channel prioritization.

In the RRC Connected state, the UE performs radio link monitoring. The downlink radio link quality of the primary cell is monitored by physical layer in the UE for the purpose of indicating out-of-sync/in-sync status to higher layers. The physical layer in the UE indicates, in frames where the radio link quality is assessed, out-of-sync to higher layers when the radio link quality is worse than the threshold Q_out for all resources in the set of resources for radio link monitoring.

When the radio link quality is better than the threshold Q_in for any resource in the set of resources for radio link monitoring, the physical layer in the UE indicates, in frames where the radio link quality is assessed, in-sync to higher layers (i.e. RRC).

Upon receiving N310 consecutive out-of-sync indications from lower layers (i.e. physical layer), higher layer (i.e. RRC) starts a timer T310. The value of N310 and T310 is configured by network using RRC signaling.

Upon start of T310:

if the UE is configured with SL configured grant, and UseConfiguredGrant indication is received from the gNB, The UE continue to use the configured SL grants while T310 is running. In each configured SL grant, the UE schedules data from one or more SL LCH(s) which are allowed to use that configured SL grant according to logical channel prioritization. The UE can continue to use the dynamic SL grant received from the gNB while T310 is running and the UE stops monitoring for the dynamic SL grant upon expiry of T310. Alternately, the UE stops monitoring for the dynamic SL grant upon start of T310.

Else

The UE uses the resources from exceptional TX resource pool received from the gNB in the SI or the dedicated RRC signaling for SL transmissions. The UE stops using dynamic SL grant and configured SL grant for SL transmissions.

Upon expiry of timer T310, configured SL grant configurations received from the gNB is released. Upon expiry of timer T310, the UE uses the resources from an exceptional TX resource pool received from the gNB in the SI or the dedicated RRC signaling for SL transmissions.

In another embodiment, when the UE is configured with the scheduled resource allocation and the configured SL grants are not configured:

Option 1: the UE can continue to use the dynamic SL grant received from the gNB while T310 is running and the UE stops monitoring for a dynamic SL grant upon expiry of T310. Upon expiry of timer T310, the UE uses the resources from exceptional TX resource pool received from the gNB in the SI or the dedicated RRC signaling for SL transmissions.

Option 2: the UE stops monitoring for the dynamic SL grant upon start of timer T310. Upon start of timer T310, the UE uses the resources from exceptional TX resource pool received from the gNB in the SI or the dedicated RRC signaling for the SL transmissions. If T310 is stopped due to in sync indications, the UE starts monitoring for the dynamic SL grant.

In one embodiment of the above operation the configured SL grant is of CG Type 1. In another embodiment of the above operation the configured SL grant is of CG Type 2. In another embodiment of the above operation the configured SL grant can be any of CG type 1 or CG type 2.

Embodiment 2

Dual Active Protocol Stack (DAPS) and Interruption Handling

Current Operation is as follows:

1. The UE receives a RRCReconfiguration message including reconfiguration with sync.
2. The UE starts T304.
3. The UE applies the target PCell's sidelink configuration (i.e. configuration received in sl-ConfigDedicatedNR IE)

If Mode 1 (i.e. sl-ScheduledConfig) is configured in sl-ConfigDedicatedNR
   While T304 is running, the UE uses an exceptional resource pool for SL transmission, if the exceptional resource pool for SL transmission is signaled
Else if Mode 2 (i.e. sl-UE-SelectedConfig) is configured in sl-ConfigDedicatedNR
   Until sensing results are available for the normal TX resource pool, the UE uses the exceptional resource pool for SL transmission, if the exceptional resource pool for SL transmission is signaled
4. The UE performs a DL sync and a RA procedure towards the target cell.
5. Stop T304 upon completion of the RA procedure.

The issue is that the current operation is designed for normal handover. Recently DAPS HO is introduced for handover interruption on link between the UE and the gNB. During handover, the UE performing V2X communication also experience interruption which can be further enhanced using DAPS handover.

Embodiment 2-1

1. The UE is in the RRC Connected state. The UE receives RRCReconfiguration message including SL configuration for SL communication.
2. The UE receives RRCReconfiguration message including reconfigurationWithSync. reconfigurationWithSync is included in spCellConfig of CellGroupConfig of MCG. RRCReconfiguration message includes SL configuration for SL communication. This SL configuration is from the target cell (i.e. PCell).
3. The UE starts T304.
4. The UE determines whether dapsConfig is configured for any DRB (i.e. Uu DRB) in an RRCReconfiguration message received in operation 2.
5. If dapsConfig is not configured for any DRB:
The MAC entity is reset for this cell group (i.e. MCG)
The UE applies the target PCell's sidelink configuration (i.e. configuration received in sl-ConfigDedicatedNR in operation 2)
   If Mode 1 (i.e. sl-ScheduledConfig) is configured in sl-ConfigDedicatedNR
      While T304 is running, the UE uses the exceptional resource pool for SL transmission, if the UE is configured with sl-TxPoolExceptional included in sl-ConfigDedicatedNR for the concerned frequency in RRCReconfiguration
   Else if Mode 2 (i.e. sl-UE-SelectedConfig) is configured in sl-ConfigDedicatedNR
      Until sensing results are available for the normal TX resource pool, use the exceptional resource pool for SL transmission if the UE is configured with sl-TxPoolExceptional for the concerned frequency in RRCReconfiguration
An SL operation is performed using this MAC entity
6. If dapsConfig is configured for any DRB:
Create a MAC entity for the target. The source MAC entity is not released. So, there will be two MAC entities for the same cell group (i.e. MCG)
The UE continues to use the source cell configuration (received in operation 1) for sidelink communication until the random access procedure is completed on the target cell (or until source release indication is received in the RRC reconfiguration message); continue to perform DL/UL reception/transmission related to sidelink communication with source cell until the random access procedure is completed on the target cell (or until source release indication is received in the RRC reconfiguration message);
The SL operation is performed using a source cell MAC entity (using source cell's SL configuration received in operation 1) until the random access procedure is completed on the target cell (or until source release indication is received in the RRC reconfiguration message)
In an embodiment, the SL operation is performed using the source cell MAC entity (using source cell's SL configuration received in operation 1) until the random access procedure is completed on the target cell if the Scheduled resource allocation is configured in the target cell. In an embodiment, the SL operation is performed using the source cell MAC entity (using source cell's SL configuration received in operation 1) until source release indication is received in the RRC reconfiguration message if the UE selected resource allocation is configured in the target cell.
7. The UE performs the DL sync and the RA procedure towards the target cell.
8. Upon completion of the RA procedure:
Stop T304
9. If dapsConfig is configured for any DRB, upon completion of the RA procedure (or upon receiving source release indication in the RRC reconfiguration message):
   A. The UE applies the target PCell's sidelink configuration (i.e. sl-ConfigDedicatedNR received in the RRC Reconfiguration message including reconfigurationWithSync in operation 2)
   B. The SL operation is performed using a target cell MAC entity Embodiment 2-2

The RRCReconfiguration message can include an indication to indicate whether the SL operation can continue in source MAC entity until the RA procedure is completed in the target cell (i.e., target MAC entity).
1. The UE is in a RRC Connected state. The UE receives the RRCReconfiguration message including SL configuration for SL communication.
2. The UE receives the RRCReconfiguration message including reconfigurationWithSync. reconfigurationWithSync is included in spCellConfig of CellGroupConfig of MCG. RRCReconfiguration message includes SL configuration for SL communication. This SL configuration is from the target cell (i.e., PCell).
3. The UE starts T304.
4. The UE determines whether dapsConfig is configured for any DRB (i.e. Uu DRB) in the RRCReconfiguration message received in operation 2
5. If dapsConfig is not configured for any DRB:
The MAC entity is reset for this cell group (i.e. MCG)
The UE applies the target PCell's sidelink configuration (i.e. sl-ConfigDedicatedNR in the RRCReconfiguration message received in operation 2)
   If Mode 1 (i.e. sl-ScheduledConfig) is configured in sl-ConfigDedicatedNR: While T304 is running, use the exceptional resource pool for SL transmission, if the UE is configured with sl-TxPoolExceptional included in sl-ConfigDedicatedNR for the concerned frequency in RRCReconfiguration
   Else if Mode 2 (i.e. sl-UE-SelectedConfig) is configured in sl-ConfigDedicatedNR: Until sensing results are available for a normal TX pool, use the exceptional resource pool for SL transmission if the UE is configured with sl-TxPoolExceptional for the concerned frequency in RRCReconfiguration The SL operation is performed using this MAC entity 6. If dapsConfig is configured for any DRB:

Create a MAC entity for the target. Source MAC entity is not released. So, there will be two MAC entities for the same cell group (i.e. MCG)

If (ContinueSLOperationinSource is received in the RRCReconfiguration message in operation 2)
  A. The UE continues to use the source cell configuration (received in operation 1) for sidelink communication until a random access procedure is completed on the target cell (or until source release indication is received in the RRC reconfiguration message); continue to perform DL/UL reception/transmission related to sidelink communication with source cell until the random access procedure is completed on the target cell (or until source release indication is received in the RRC reconfiguration message)
  B. The SL operation is performed using the source cell MAC entity until the random access procedure is completed on the target cell (or until source release indication is received in the RRC reconfiguration message)
  C. In an embodiment, the SL operation is performed using the source cell MAC entity (using source cell's SL configuration received in operation 1) until the random access procedure is completed on the target cell if the Scheduled resource allocation is configured in target the cell. In an embodiment, the SL operation is performed using the source cell MAC entity (using source cell's SL configuration received in operation 1) until source release indication is received in the RRC reconfiguration message if the UE selected resource allocation is configured in the target cell.

Else If ContinueSLOperationinSource is not received in a RRCReconfiguration message in operation 2 (or is set to FALSE);
  A. The UE applies the target PCell's sidelink configuration (i.e. sl-ConfigDedicatedNR received in the RRC Reconfiguration message including reconfigurationWithSync in operation 2)
  B. If Mode 1 (i.e. sl-ScheduledConfig) is configured in sl-ConfigDedicatedNR: While T304 is running, use the exceptional resource pool for SL transmission, if the UE is configured with sl-TxPoolExceptional included in sl-ConfigDedicatedNR for the concerned frequency in RRCReconfiguration
  C. Else if Mode 2 (i.e. sl-UE-SelectedConfig) is configured in sl-ConfigDedicatedNR: Until sensing results are available for the normal TX pool, use the exceptional resource pool for SL transmission if the UE is configured with sl-TxPoolExceptional for the concerned frequency in RRCReconfiguration
  D. The SL operation is performed using the target cell MAC entity 7. The UE performs the DL sync and the RA procedure towards the target cell.

8. Upon completion of the RA procedure:
Stop T304

9. Upon completion of the RA procedure (or upon receiving source release indication in the RRC reconfiguration message):

If dapsConfig is configured for any DRB and if ContinueSLOperationinSource is received in the RRCReconfiguration message in operation 2:
  i. The UE applies the target PCell's sidelink configuration (i.e. sl-ConfigDedicatedNR received in the RRC Reconfiguration message including reconfigurationWithSync in operation 2)
  ii. The SL operation is performed using the target cell MAC entity Embodiment 2-3

For some SL DRB (indicated in the RRCReconfiguration message), the SL operation is performed using source MAC entity and for others the SL operation is performed using target MAC entity.

Figure 8:
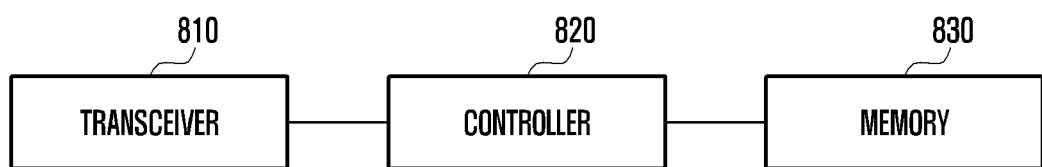
FIG. 8 is a block diagram of a terminal according to an embodiment of the disclosure.

FIG. 8 is a block diagram of a terminal according to an embodiment of the disclosure.

Referring to FIG. 8, a terminal includes a transceiver 810, a controller 820 and a memory 830. The controller 820 may refer to a circuitry, an application-specific integrated circuit (ASIC), or at least one processor. The transceiver 810, the controller 820 and the memory 830 are configured to perform the operations of the terminal illustrated in the figures, e.g. FIGS. 1 to 7, or described above. Although the transceiver 810, the controller 820 and the memory 830 are shown as separate entities, they may be realized as a single entity like a single chip. Or, the transceiver 810, the controller 820 and the memory 830 may be electrically connected to or coupled with each other.

The transceiver 810 may transmit and receive signals to and from other network entities, e.g., a base station. The controller 820 may control the terminal to perform functions according to one of the embodiments described above. The controller 820 may refer to a circuitry, an ASIC, or at least one processor. In an embodiment, the operations of the terminal may be implemented using the memory 830 storing corresponding program codes. Specifically, the terminal may be equipped with the memory 830 to store program codes implementing desired operations. To perform the desired operations, the controller 820 may read and execute the program codes stored in the memory 830 by using a processor or a central processing unit (CPU).

Figure 9:
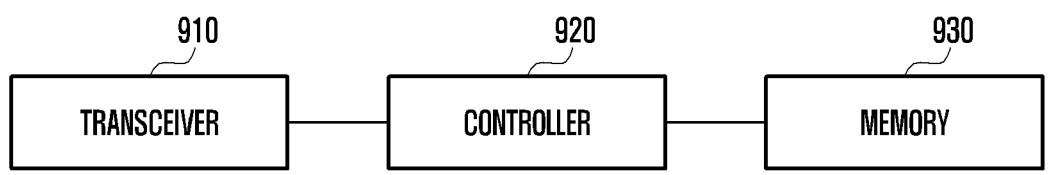
FIG. 9 is a block diagram of a base station according to an embodiment of the disclosure.

FIG. 9 is a block diagram of a base station according to an embodiment of the disclosure.

Referring to FIG. 9, a base station includes a transceiver 910, a controller 920 and a memory 930. The transceiver 910, the controller 920 and the memory 930 are configured to perform the operations of the network entity (e.g., gNB) illustrated in the figures, e.g. FIGS. 1 to 7, or described above. Although the transceiver 910, the controller 920 and the memory 930 are shown as separate entities, they may be realized as a single entity like a single chip. The transceiver 910, the controller 920 and the memory 930 may be electrically connected to or coupled with each other.

The transceiver 910 may transmit and receive signals to and from other network entities, e.g., a terminal. The controller 920 may control the base station to perform functions according to one of the embodiments described above. The controller 920 may refer to a circuitry, an ASIC, or at least one processor. In an embodiment, the operations of the base station may be implemented using the memory 930 storing corresponding program codes. Specifically, the base station may be equipped with the memory 930 to store program codes implementing desired operations. To perform the desired operations, the controller 920 may read and execute the program codes stored in the memory 930 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first terminal in a wireless communication system, the method comprising:
receiving, from a base station, a control message including a configuration for a configured sidelink grant;
transmitting, to a second terminal, sidelink signal based on the configured sidelink grant for a first sidelink logical channel which is allowed to use the configured sidelink grant;
starting a timer associated with a radio link failure, in case that a consecutive out of synchronization indications for a cell are received from a lower layer;
identifying whether there is a second sidelink logical channel which is not available for the configured sidelink grant;
transmitting, to the second terminal while the timer is running, sidelink signal based on the configured sidelink grant, in case that there is no sidelink logical channel not available for the configured sidelink grant; and
transmitting, to the second terminal while the timer is running, sidelink signal based on a resource from an exceptional transmission pool, in case that there is the second sidelink logical channel not available for the configured sidelink grant.

2. The method of claim 1, wherein the identifying of whether there is the second sidelink logical channel further comprises identifying whether an indication to use the configured sidelink grant for all of the first sidelink logical channel and the second sidelink logical channel is received from the base station.

3. The method of claim 1, wherein the identifying of whether there is the second sidelink logical channel further comprises identifying whether an association between the second sidelink logical channel and the configured sidelink grant is received from the base station.

4. The method of claim 1, wherein the identifying of whether there is the second sidelink logical channel further comprises identifying whether a logical channel priority of the second sidelink logical channel is included in a list of logical channel priorities of the configured sidelink grant.

5. The method of claim 1, wherein the identifying of whether there is the second sidelink logical channel further comprises identifying whether a logical channel priority of the second sidelink logical channel is equal to or lower than a priority threshold for which the configured sidelink grant cannot be used.

6. A method performed by a second terminal in a wireless communication system, the method comprising:
receiving, from a base station, a control message including a configuration for a configured sidelink grant; and
receiving, from a first terminal, sidelink signal based on the configured sidelink grant for a first sidelink logical channel which is allowed to use the configured sidelink grant,
wherein, while a timer associated with a radio link failure is running, sidelink signal is received from the first terminal based on the configured sidelink grant, in case that there is no sidelink logical channel not available for the configured sidelink grant, and
wherein, while the timer is running, sidelink signal is received from the first terminal based on a resource from an exceptional transmission pool, in case that there is second sidelink logical channel not available for the configured sidelink grant.

7. The method of claim 6, wherein whether an indication to use the configured sidelink grant for all of the first sidelink logical channel and the second sidelink logical channel is received is identified to determine the second sidelink logical channel.

8. The method of claim 6, wherein whether an association between the second sidelink logical channel and the configured sidelink grant is received is identified to determine the second sidelink logical channel.

9. The method of claim 6, wherein whether a logical channel priority of the second sidelink logical channel is included in a list of logical channel priorities of the configured sidelink grant is identified to determine the second sidelink logical channel.

10. The method of claim 6, wherein whether a logical channel priority of the second sidelink logical channel is equal to or lower than a priority threshold for which the configured sidelink grant cannot be used is identified to determine the second sidelink logical channel.

11. A terminal in a wireless communication system, the terminal comprising:
a transceiver configured to transmit and receive a signal; and
a controller configured to:
receive, from a base station, a control message including a configuration for a configured sidelink grant,
transmit, to a second terminal, sidelink signal based on the configured sidelink grant for a first sidelink logical channel which is allowed to use the configured sidelink grant,
start a timer associated with a radio link failure, in case that a consecutive out of synchronization indications for a cell are received from a lower layer,
identify whether there is a second sidelink logical channel which is not available for the configured sidelink grant,
transmit, to the second terminal while the timer is running, sidelink signal based on the configured sidelink grant, in case that there is no sidelink logical channel not available for the configured sidelink grant, and
transmit, to the second terminal while the timer is running, sidelink signal based on a resource from an exceptional transmission pool, in case that there is the second sidelink logical channel not available for the configured sidelink grant.

12. The terminal of claim 11, wherein the controller is further configured to identify whether an indication to use the configured sidelink grant for all of the first sidelink logical channel and the second sidelink logical channel is received from the base station.

13. The terminal of claim 11, wherein the controller is further configured to identify whether an association between the second sidelink logical channel and the configured sidelink grant is received from the base station.

14. The terminal of claim 11, wherein the controller is further configured to identify whether a logical channel priority of the second sidelink logical channel is included in a list of logical channel priorities of the configured sidelink grant.

15. The terminal of claim 11, wherein the controller is further configured to identify whether a logical channel priority of the second sidelink logical channel is equal to or lower than a priority threshold for which the configured sidelink grant cannot be used.

16. A second terminal in a wireless communication system, the second terminal comprising:
a transceiver configured to transmit and receive a signal; and
a controller configured to:
receive, from a base station, a control message including a configuration for a configured sidelink grant, and
receive, from a first terminal, sidelink signal based on the configured sidelink grant for a first sidelink logical channel which is allowed to use the configured sidelink grant,
wherein, while a timer associated with a radio link failure is running, sidelink signal is received from the first terminal based on the configured sidelink grant, in case that there is no sidelink logical channel not available for the configured sidelink grant, and
wherein, while the timer is running, the sidelink signal is received from first terminal based on a resource from an exceptional transmission pool, in case that there is second sidelink logical channel not available for the configured sidelink grant.

17. The second terminal of claim 16, wherein whether an indication to use the configured sidelink grant for all of the first sidelink logical channel and the second sidelink logical channel is received is identified to determine the second sidelink logical channel.

18. The second terminal of claim 16, wherein whether an association between the second sidelink logical channel and the configured sidelink grant is received is identified to determine the second sidelink logical channel.

19. The second terminal of claim 16, wherein whether a logical channel priority of the second sidelink logical channel is included in a list of logical channel priorities of the configured sidelink grant is identified to determine the second sidelink logical channel.

20. The second terminal of claim 16, wherein whether a logical channel priority of the second sidelink logical channel is equal to or lower than a priority threshold for which the configured sidelink grant cannot be used is identified to determine the second sidelink logical channel.

* * * * *